W. L. CRABILL & W. E. WILEY.
HOSE CLAMP.
APPLICATION FILED SEPT. 22, 1917.
1,268,934.
Patented June 11, 1918.
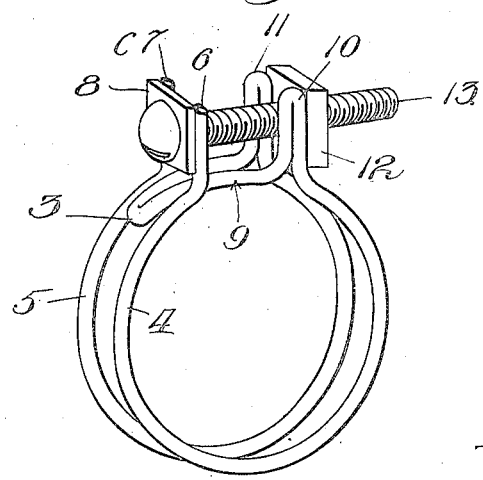
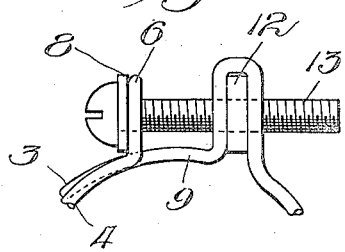
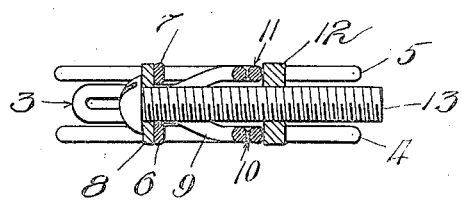

UNITED STATES PATENT OFFICE.

WILLIAM L. CRABILL AND WILLIAM E. WILEY, OF BATTLE CREEK, MICHIGAN.

HOSE-CLAMP.

1,268,934.

Specification of Letters Patent. Patented June 11, 1918.

Application filed September 22, 1917. Serial No. 192,662.

*To all whom it may concern:*

Be it known that we, WILLIAM L. CRABILL and WILLIAM E. WILEY, both citizens of the United States, and both residing at Battle Creek, in the county of Calhoun and State of Michigan, have invented certain new and useful Improvements in Hose-Clamps, of which the following is a specification.

This invention relates to an improved clamp for use in attaching hose to a nipple, pipe, or other conduit. It is an essential object of our invention that the clamp should be extremely simple in construction, inexpensive to manufacture, and effective in its grip upon the hose. With these ends in view, we employ wire, preferably round in cross section, which is lapped around the hose in two coils, instead of the ordinary band or strap of metal which requires more material in its use. Our invention which will more fully appear from the specification and claims is clearly illustrated in the accompanying drawing wherein—

Figure 1 is a perspective view of a hose clamp made in accordance with our invention;

Fig. 2 is a cross sectional view taken longitudinally along the axis of the bolt, an edge view of the clamp in elevation being also afforded; and Fig. 3 is a fragmentary perspective view of a modified form of hose clamp.

In the drawing, similar reference numerals refer to similar parts in the different views.

Our invention in its preferred embodiment consists of a single length of wire bent upon itself substantially at the middle point, designated as 3. In this manner we provide a double formation of wire which is suitably curved or bent to encircle the hose in two coils marked 4 and 5. The free ends of the wire coils designated as 6 and 7 are turned to parallel positions which are more or less radial with respect to the axis of the hose to provide bearings against which is secured a transverse element such as an eye plate 8. A convenient method of attaching the plate to the ends of the wire is by welding.

In their encircling position upon the hose the two coils of the clamp lie in substantially parallel planes at every point throughout their length except at the bend 3. The wires adjacent this bend are spaced sufficiently close together to provide a tongue 9 which may enter between the coils 4 and 5 adjacent the ends 6 and 7. Each coil is suitably crimped to provide bearings 10 and 11 against which may seat a second transverse element, such as a nut 12. This nut we prefer to secure fixedly in place by a weld, or other appropriate means. Likewise the sections of wire lapping against each other along the crimp are preferably welded together to secure additional strength. A threaded stove bolt 13 is entered through the eye plate and engaged with the nut so as to draw the ends of the clamp together when properly rotated. In this manner the hose is clamped tightly upon the nipple or pipe with which it is connected.

The hose clamp which we have shown and described possesses advantages over any with which we are aware in the following particulars: It is exceedingly simple, requires but few bends, and consequently it is easy to manufacture. At no point are its coils in helical formation. The transverse braces for the bolt are supplied by means of the eye plate 8 and the nut 12, each of which may be secured in place by the simple expedient of a weld. The tongue 9 consists of double wires joined at the end 3 so as to preserve each wire in alinement with the other at all times. By this means a firmer clamping action can be secured than where the tongue ends are each independent of the other.

It will be understood that our invention is susceptible of several variations and modifications which we have not attempted to illustrate or describe, but which would readily suggest themselves to anyone skilled in the art to which this invention relates. One such modification is shown in Fig. 3 of the drawings. In this case wire coil bearings 10 and 11 span or encircle the nut 12, to which they are welded or otherwise attached, instead of both lying on one side of the nut, as in the form shown in Figs. 1 and 2. Other modifications are also to be considered as within the scope of our invention, as defined by the appended claims which follow.

We claim:

1. A hose clamp consisting of a single length of wire folded at its center and bent to provide double coils spaced apart uniformly except at the folded end which is adapted to enter between the free ends, the coils near the folded end being each crimped to provide a bearing for a nut, and the free ends being each turned in substantially parallel relation to the crimps, an eye plate secured between the turned free ends of the coils, a nut secured between the crimps, and a threaded element between the eye plate and nut adapted to draw the ends of the clamp together, substantially as described.

2. A hose clamp consisting of a single length of wire bent to provide double coils spaced apart uniformly for the major portion of their length, the coils near one end thereof being provided with a crimp and near the other end with a bend, an eye plate welded to the coils near one end, a nut welded to the coils near their other end, and a threaded bolt between the eye plate and nut adapted to draw the ends of the clamp together, substantially as described.

3. A hose clamp consisting of a single length of wire bent in double formation and curved to provide two coils adapted to surround a hose in parallel relation, the wire being bent laterally between the coils to provide a tongue at one end of the coils adapted to occupy a lapping relation with the other end of the coils, bends in the coils near the ends thereof providing bearings in substantially radial relation to the axis of the hose, an eye plate extended transversely between one set of bearings and a nut between the other, and a threaded bolt between the eye plate and nut adapted to draw the ends of the clamp together.

4. A hose clamp consisting of a single length of wire bent in double formation and curved to provide two coils adapted to surround a hose, the two coils at corresponding places being crimped to provide bearings one in line with each coil for an element extending transversely therebetween, the lapping sections of wire forming the crimp being welded together, and each coil being elsewhere bent at corresponding places to provide bearings for another transverse element, two elements arranged transversely between the different sets of bearings, and a threaded bolt between the two transverse elements for drawing the ends of the clamp together, substantially as described.

5. A hose clamp consisting of a single length of wire bent to provide an encircling coil for a hose, and having near one end thereof a crimp formed by bending portions of the wire in parallel relation in the plane of the coil and in a direction substantially radial with respect to the axis of the hose and welding together the facing surfaces of the wire portions which form the crimp, the other end of the wire coil being provided also with a bent portion extending in a direction which is likewise substantially radial with respect to the axis of the hose, elements engageable by a bolt secured to the crimp and to the bent portion at the other end, and a bolt arranged operatively between the elements, substantially as described.

WILLIAM L. CRABILL.
WILLIAM E. WILEY.